Royal G Kinner's Improvement in Wrappers.
101275    PATENTED MAR 29 1870
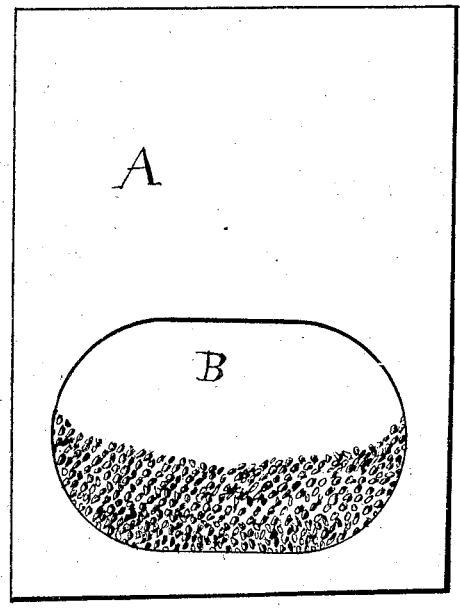
John L. Lewis  } Witnesses.
Charles Hotchmy
Royal G Kinner Inventor.

United States Patent Office.

ROYAL G. KINNER, OF PENN YAN, NEW YORK.

Letters Patent No. 101,275, dated March 29, 1870.

IMPROVED WRAPPER FOR SEEDS, &c.

The Schedule referred to in these Letters Patent and making part of the same

I, ROYAL G. KINNER, of Penn Yan, in the county of Yates and State of New York, have invented certain Improvements in Wrappers for Seeds and other commodities, of which the following is a specification.

My invention relates to wrappers for seeds or other commodities that has fixed in one side a transparency of any convenient size, through which the contents within the wrapper may be seen without opening it.

A is the wrapper. It may be made of paper, cloth, or other material, according to the use it is intended for, and be fasted together with any ordinary means. Through one of its sides a hole is made, of sufficient size or shape to allow the contents of the wrapper to be sufficiently and satisfactorily examined. To the hole is fitted and fastened a piece of glass, mica, or other transparent material, so that the contents cannot escape, and allow free examination of the contents through the hole.

B is the transparent material that is fastened over the hole in the wrapper, as represented in the figure.

I claim the wrapper A, when made with a hole in one of its sides, and provided with a transparency, B, covering the hole, substantially as and for the purpose herein set forth.

ROYAL G. KINNER.

Witnesses:
JOHN L. LEWIS,
CHARLES KETCHUM.